(12) United States Patent
Zhu et al.

(10) Patent No.: US 10,828,870 B2
(45) Date of Patent: Nov. 10, 2020

(54) PROCESS FOR MANUFACTURING APRON BOARD OF HIGH-SPEED RAIL EQUIPMENT CABIN USING COMPOSITE MATERIAL

(71) Applicant: SHANGHAI CEDAR COMPOSITES TECHNOLOGY CO., LTD., Shanghai (CN)

(72) Inventors: Jiaqiang Zhu, Shanghai (CN); Bin Wang, Shanghai (CN); Sishun Zhang, Shanghai (CN); Ming Wang, Shanghai (CN); Changzhi Xie, Shanghai (CN); Jianlan Luo, Shanghai (CN); Yongkai Liu, Shanghai (CN)

(73) Assignee: SHANGHAI CEDAR COMPOSITES TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/063,250

(22) PCT Filed: Aug. 23, 2016

(86) PCT No.: PCT/CN2016/096333
§ 371 (c)(1),
(2) Date: Jun. 16, 2018

(87) PCT Pub. No.: WO2017/101490
PCT Pub. Date: Jun. 22, 2017

(65) Prior Publication Data
US 2018/0370192 A1 Dec. 27, 2018

(30) Foreign Application Priority Data
Dec. 16, 2015 (CN) .......................... 2015 1 0947266

(51) Int. Cl.
*B29C 70/08* (2006.01)
*B29C 70/34* (2006.01)
(Continued)

(52) U.S. Cl.
CPC .......... *B32B 17/02* (2013.01); *B29C 66/7254* (2013.01); *B29C 70/083* (2013.01);
(Continued)

(58) Field of Classification Search
CPC . E04C 2/365; B61D 17/005; B29C 66/72525; B29C 66/7254; B29C 70/083;
(Continued)

(56) References Cited

U.S. PATENT DOCUMENTS 5,667,866 A * 9/1997 Reese, Jr. ................. B32B 3/12
428/116
6,117,518 A * 9/2000 Cawse ................. B29C 70/088
428/116
(Continued)

OTHER PUBLICATIONS

Machine translation of Chinese Patent Publication No. CN-201516849U, originally published Jun. 30, 2010 (Year: 2010).*

*Primary Examiner* — Michael A Tolin

(57) ABSTRACT

A process for manufacturing an apron board of a high-speed rail equipment cabin using a composite material is disclosed. The material includes aramid fiber honeycomb, PET foam, 3K twill carbon fiber flame retardant prepreg, unidirectional carbon fiber flame retardant prepreg, glass fiber flame retardant prepreg, aramid flame retardant prepreg, and 300 g/m² single component medium temperature curing blue epoxy adhesive. The process includes manufacturing an apron main plate (3); manufacturing apron-board trim strips (1, 2), wherein there are two apron-board trim strips (1) and two apron-board trim strips (2); and obtaining the apron board through the apron main plate (3) and the apron-board trim strips (1, 2), wherein the two apron-board trim strips (1) are respectively stuck at two opposite sides of the apron main plate (3), the two apron-board trim strips (2) are respectively stuck at another two opposite sides of the apron main plate (3).

2 Claims, 2 Drawing Sheets

(51) Int. Cl.
    *B29C 70/68* (2006.01)
    *B32B 5/26* (2006.01)
    *B32B 3/12* (2006.01)
    *B32B 17/02* (2006.01)
    *B32B 37/12* (2006.01)
    *B29C 65/00* (2006.01)
    *B32B 37/14* (2006.01)
    *B32B 5/18* (2006.01)
    *B32B 7/12* (2006.01)
    *B32B 9/00* (2006.01)
    *B32B 27/06* (2006.01)
    *B29L 31/30* (2006.01)
    *B29L 31/60* (2006.01)
    *B32B 27/12* (2006.01)
    *B32B 37/10* (2006.01)

(52) U.S. Cl.
    CPC .......... *B29C 70/085* (2013.01); *B29C 70/345* (2013.01); *B29C 70/682* (2013.01); *B32B 5/18* (2013.01); *B32B 5/26* (2013.01); *B32B 7/12* (2013.01); *B32B 9/007* (2013.01); *B32B 27/065* (2013.01); *B32B 37/1207* (2013.01); *B32B 37/146* (2013.01); *B29L 2031/3064* (2013.01); *B29L 2031/608* (2013.01); *B32B 27/12* (2013.01); *B32B 37/10* (2013.01); *B32B 2262/101* (2013.01); *B32B 2262/106* (2013.01); *B32B 2305/024* (2013.01); *B32B 2307/3065* (2013.01); *B32B 2309/02* (2013.01); *B32B 2309/04* (2013.01); *B32B 2309/12* (2013.01); *B32B 2605/10* (2013.01)

(58) Field of Classification Search
    CPC ..... B29C 70/085; B29C 70/086; B29C 70/20; B29C 70/202; B29C 70/205; B29C 70/207; B29C 70/22; B29C 70/222; B29C 70/34; B29C 70/342; B29C 70/345; B29C 70/42; B29C 70/44; B29C 70/46; B29C 70/68; B29C 70/682; B29L 2031/3064; B29L 2031/608; B32B 3/12; B32B 5/26; B32B 37/146; B32B 2305/024
    See application file for complete search history.

(56) References Cited

U.S. PATENT DOCUMENTS

| | | | |
|---|---|---|---|
| 2004/0001946 A1* | 1/2004 | Ma | B29C 44/22 428/317.9 |
| 2006/0046019 A1* | 3/2006 | Wang | B32B 3/12 428/73 |
| 2008/0131645 A1* | 6/2008 | Horigome | B32B 3/12 428/73 |
| 2008/0318000 A1* | 12/2008 | Horigome | B32B 3/12 428/116 |
| 2015/0151524 A1* | 6/2015 | Matsura | B32B 37/1009 156/285 |
| 2017/0240188 A1* | 8/2017 | Claudel | B61D 17/005 |

* cited by examiner

PROCESS FOR MANUFACTURING APRON BOARD OF HIGH-SPEED RAIL EQUIPMENT CABIN USING COMPOSITE MATERIAL

CROSS REFERENCE OF RELATED APPLICATION

This is a U.S. National Stage under 35 U.S.C 371 of the International Application PCT/CN2016/096333, filed Aug. 23, 2016, which claims priority under 35 U.S.C. 119(a-d) to CN 201510947266.1, filed Dec. 16, 2015.

BACKGROUND OF THE PRESENT INVENTION

Field of Invention

The present invention relates to a process for manufacturing an apron board of a high-speed rail equipment cabin, and more particularly to a process for manufacturing an apron board of a high-speed rail equipment cabin using a composite material with high strength and light weight.

Description of Related Arts

The apron board of high-speed rail equipment cabin is an important part of the equipment cabin of standard high-speed train. In practical application, lamination design, material usage and technique design are considered since there are certain requirements on bearing ability, flame retardant ability and impact resistant ability of the apron board; along with the constant update of science and technology, light weight and smooth-going design are used to effectively reduce the resistance of the train during operation, thereby reducing the continuous energy consumption. Under the condition of ensuring comprehensive performance, using of composite materials instead of aluminum alloy materials can reduce the weight of the overall train and enhance the level of light weight performance of the overall train.

SUMMARY OF THE PRESENT INVENTION

In view of the above problems, a main object of the present invention is to provide a process for manufacturing an apron board of a high-speed rail equipment cabin using a composite material with high strength and light weight.

The present invention solves the above technical problems by the following technical solutions: a process for manufacturing an apron board of a high-speed rail equipment cabin using a composite material, wherein the composite material includes:

aramid fiber honeycomb, PET (Polyethylene terephthalate) foam, 3K twill carbon fiber flame retardant prepreg, unidirectional carbon fiber flame retardant prepreg, glass fiber flame retardant prepreg, aramid flame retardant prepreg, and 300 g/m$^2$ single component medium temperature curing blue epoxy adhesive;

the process for manufacturing the apron board of the high-speed rail equipment cabin using the composite material includes steps of:

(1) manufacturing an apron main plate;

(2) manufacturing apron-board trim strips, wherein there are two first apron-board trim strips and two second apron-board trim strips; and (3) obtaining the apron board of the high-speed rail equipment cabin by the apron main plate, the two first apron-board trim strips and the two second apron-board trim strips, wherein the two first apron-board trim strips are respectively stuck at two opposite sides of the apron main plate, the two second apron-board trim strips are respectively stuck at another two opposite sides of the apron main plate.

In a specific embodiment of the present invention, the step of manufacturing the apron main plate includes closely pasting multiple layers of raw materials to a mold cavity in sequence from outside to inside in a form of lamination, wherein the multiple layers of raw materials are:

1 layer of 198-200 g/m$^2$ 3K twill carbon fiber flame retardant prepreg;

5-8 layers of 300-315 g/m$^2$ glass fiber flame retardant prepreg;

2 layers of 235-240 g/m$^2$ aramid flame retardant prepreg;

2 layers of 100-150 g/m$^2$ unidirectional carbon fiber flame retardant prepreg;

1 layer of 300 g/m$^2$ single component medium temperature curing blue epoxy adhesive;

2 layers of the 100-150 g/m$^2$ unidirectional carbon fiber flame retardant prepreg;

1 piece of aramid fiber honeycomb with a thickness of 16.4 mm;

1 layer of the 100-150 g/m$^2$ unidirectional carbon fiber flame retardant prepreg;

1 layer of the 300 g/m$^2$ single component medium temperature curing blue epoxy adhesive;

2 layers of the 100-150 g/m$^2$ unidirectional carbon fiber flame retardant prepreg;

4 layers of the 300-315 g/m$^2$ glass fiber flame retardant prepreg; and 1 layer of the 198-200 g/m$^2$ 3K twill carbon fiber flame retardant prepreg; and then shaping the apron main plate through a hot press machine with a temperature of 130-150° C., a molding time of 3600-3800 s and a pressure of 4 MPa-6 MPa.

In a specific embodiment of the present invention, the apron-board trim strips are shaped through vacuum bagging, the step of manufacturing the apron-board trim strips includes closely pasting multiple layers of raw materials to a mold cavity in sequence from inside to outside in a form of lamination, wherein the multiple layers of raw materials are:

1-2 layers of 300-315 g/m$^2$ glass fiber flame retardant prepreg;

4-6 layers of 100-150 g/m$^2$ unidirectional carbon fiber flame retardant prepreg;

1 layer of 235-240 g/m$^2$ aramid flame retardant prepreg;

2 layers of the 100-150 g/m$^2$ unidirectional carbon fiber flame retardant prepreg;

1 layer of the 235-240 g/m$^2$ aramid flame retardant prepreg;

4-6 layers of the 100-150 g/m$^2$ unidirectional carbon fiber flame retardant prepreg; and 1 layer of 198-200 g/m$^2$ 3K twill carbon fiber flame retardant prepreg;

and then installing an air duct, shaping the apron-board trim strips through a hot press machine with a temperature of 130-150° C., a molding time of 3600-3800 s, a pressure of 4 MPa-6 MPa, and an internal pressure of the installed air duct being 1 MPa.

In a specific embodiment of the present invention, a density of the aramid fiber honeycomb is in a range of 48-50 kg/m$^3$.

In a specific embodiment of the present invention, a density of the PET foam is in a range of 59-61 kg/m³.

The positive and progressive results of the present invention are as follows.

The process for manufacturing the apron board of the high-speed rail equipment cabin using the composite material has the following advantages:

(1) By lamination design of the present invention, the apron board obtains very high strength at all angles, and the added aramid design gains high impact resistance.

(2) The mould pressing technique is applied to the apron main plate, and the vacuum bagging technique is applied to the apron-board trim strips to improve the strength thereof. Different techniques are applied to different product parts.

(3) Through the hot mould pressing process, the resin is low in content, which greatly reduces the weight of the apron main plate.

(4) The present invention brings not only elegant and nice appearance but also strong performance. The weight of the apron board made from the composite material is 35%-40% lower than the apron board made from the aluminum alloy material, which leads to a good prospect of application.

DETAILED DESCRIPTION OF THE PREFERRED EMBODIMENT

Some preferred embodiments are described with accompanying drawings to explain technical solutions of the present invention in detail as follows.

Figure 1:
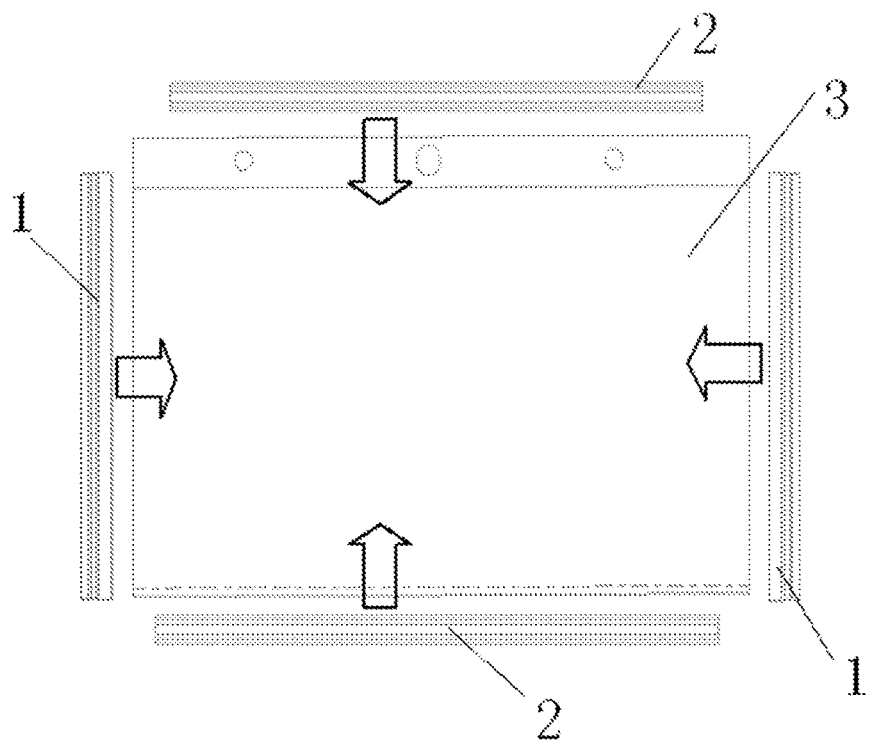
FIG. 1 is an assembly resolution diagram of an apron board provided by the present invention.
Figure 2:
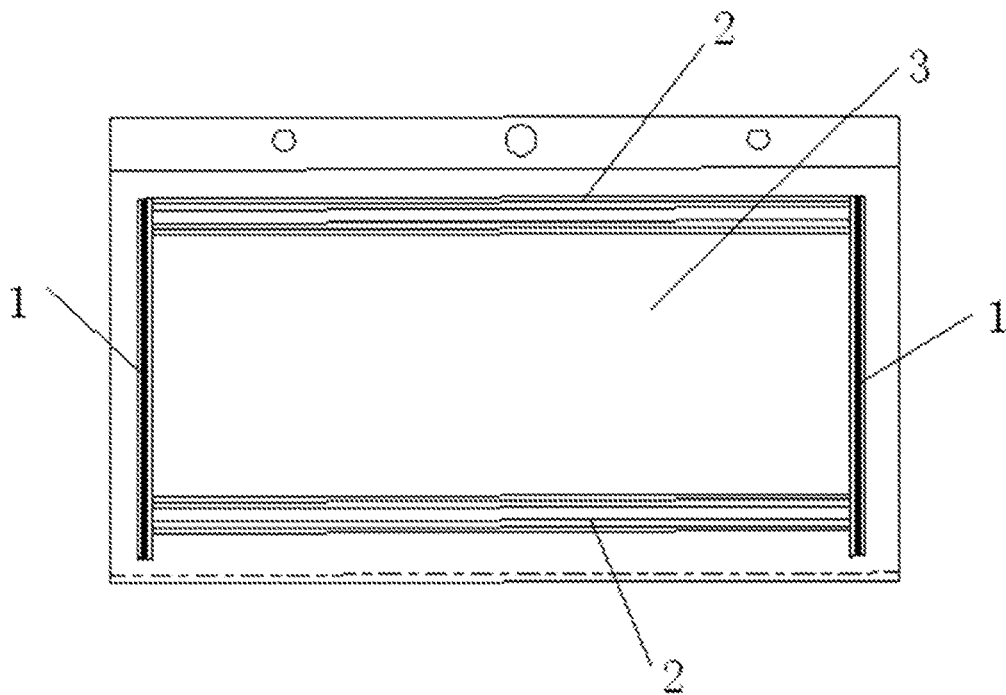
FIG. 2 is an assembly diagram of the apron board provided by the present invention.
Figure 3A:
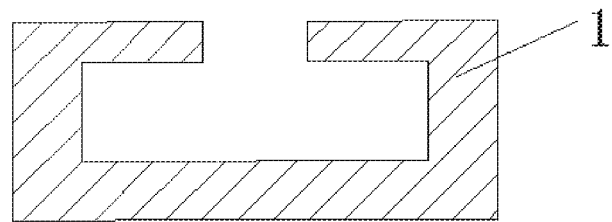
FIG. 3A is a sectional view of a first apron-board trim strip provided by the present invention.
Figure 3B:
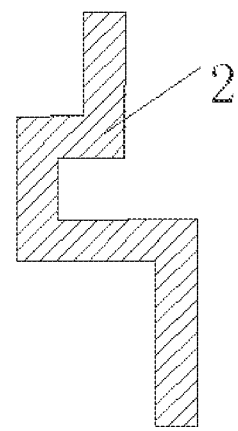
FIG. 3B is a sectional view of a second apron-board trim strip provided b the present invention.
Figure 4:
FIG. 4 is a sectional view of an apron main plate provided by the present invention.

FIG. 1 is an overall structural diagram of the present invention. As shown in FIG. 1, a composite material which is used to manufacture an apron board of a high-speed rail equipment cabin includes: aramid fiber honeycomb, PET (Polyethylene terephthalate) foam, 3K twill carbon fiber flame retardant prepreg, unidirectional carbon fiber flame retardant prepreg, glass fiber flame retardant prepreg, aramid flame retardant prepreg, and 300 g/m² single component medium temperature curing blue epoxy adhesive.

A process for manufacturing an apron board of a high-speed rail equipment cabin using a composite material includes steps of:

(1) manufacturing an apron main plate 3;

(2) manufacturing apron-board trim strips 1, 2, wherein there are two apron-board trim strips 1 and two apron-board trim strips 2; and (3) obtaining the apron board of the high-speed rail equipment cabin by the apron main plate 3, the two apron-board trim strips 1 and the two apron-board trim strips 2, wherein the two apron-board trim strips 1 are respectively stuck at two opposite sides of the apron main plate, the two apron-board trim strips 2 are respectively stuck at another two opposite sides of the apron main plate.

The step of manufacturing the apron main plate includes closely pasting multiple layers of raw materials to a mold cavity in sequence from outside to inside in a form of lamination, wherein the multiple layers of raw materials are:

1 layer of 198-200 g/m² 3K twill carbon fiber flame retardant prepreg;

5-8 layers of 300-315 g/m² glass fiber flame retardant prepreg;

2 layers of 235-240 g/m² aramid flame retardant prepreg;

2 layers of 100-150 g/m² unidirectional carbon fiber flame retardant prepreg;

1 layer of 300 g/m² single component medium temperature curing blue epoxy adhesive;

2 layers of the 100-150 g/m² unidirectional carbon fiber flame retardant prepreg;

1 piece of aramid fiber honeycomb with a thickness of 16.4 mm;

1 layer of the 100-150 g/m² unidirectional carbon fiber flame retardant prepreg;

1 layer of the 300 g/m² single component medium temperature curing blue epoxy adhesive;

2 layers of the 100-150 g/m² unidirectional carbon fiber flame retardant prepreg;

4 layers of the 300-315 g/m² glass fiber flame retardant prepreg; and 1 layer of the 198-200 g/m² 3K twill carbon fiber flame retardant, and then shaping the apron main plate through a hot press machine with a temperature of 130-150° C., a molding time of 3600-3800 s and a pressure of 4 MPa-6 MPa.

The apron-board trim strips are shaped through vacuum bagging, the step of manufacturing the apron-board trim strips includes closely pasting multiple layers of raw materials to a mold cavity in sequence from inside to outside in a form of lamination, wherein the multiple layers of raw materials are:

1-2 layers of 300-315 g/m² glass fiber flame retardant prepreg;

4-6 layers of 100-150 g/m² unidirectional carbon fiber flame retardant prepreg;

1 layer of 235-240 g/m² aramid flame retardant prepreg;

2 layers of the 100-150 g/m² unidirectional carbon fiber flame retardant prepreg;

1 layer of the 235-240 g/m² aramid flame retardant prepreg;

4-6 layers of the 100-150 g/m² unidirectional carbon fiber flame retardant prepreg; and 1 layer of 198-200 g/m² 3K twill carbon fiber flame retardant prepreg, and then installing an air duct, shaping the apron-board trim strips through a hot press machine with a temperature of 130-150° C., a molding time of 3600-3800 s, a pressure of 4-6 MPa, and an internal pressure of the installed air duct being 1 MPa.

The present invention is further explained with accompanying embodiments as follows.

First Embodiment

Step One: The Manufacturing of an Apron Main Plate with Mould Pressing Technique:

According to lamination design, 1 layer of 200 g/m² 3K twill carbon fiber flame retardant prepreg, 6 layers of 300 g/m² glass fiber flame retardant prepreg, 3 layers of 235 g/m² aramid flame retardant prepreg, 2 layers of 150 g/m² unidirectional carbon fiber flame retardant prepreg, 1 layer of 300 g/m² single component medium temperature curing blue epoxy adhesive, 2 layers of 150 g/m² unidirectional carbon fiber flame retardant prepreg, 1 piece of aramid fiber honeycomb with a thickness of 16.4 mm, 1 layer of 300 g/m² single component medium temperature curing blue epoxy adhesive, 2 layers of 100-150 g/m² unidirectional carbon fiber flame retardant prepreg, 4 layers of 300 g/m² glass fiber flame retardant prepreg, and 1 layer of 200 g/m² 3K twill carbon fiber flame retardant prepreg are laminated in sequence from outside to inside, all layers are pasted in a mould cavity closely with a temperature of 130° C., a molding time of 3600 s and a pressure of 4 MPa.

Step two: The manufacturing of the two apron-board trim strips 1 and the two apron-board trim strips 2 through vacuum bagging; 1 layer of 300 g/m² glass fiber flame retardant prepreg, 6 layers of 150 g/m² unidirectional carbon fiber flame retardant prepreg, 1 layer of 235 g/m² aramid flame retardant prepreg, 2 layers of 150 g/m² unidirectional carbon fiber flame retardant prepreg, 1 layer of 235 g/m² aramid flame retardant prepreg, 6 layers of 150 g/m² unidirectional carbon fiber flame retardant prepreg, and 1 layer of 200 g/m² 3K twill carbon fiber flame retardant prepreg are laminated in sequence from inside to outside; all layers are pasted closely in a mould cavity; after installation of an air duct, the apron-board trim strips are shaped through a hot press machine with a temperature of 130° C., a molding time of 3600 s, a pressure of 4 MPa, and an internal pressure of the installed air duct being 1 MPa.

Step Three: The Performing of CNC (Computer Numerical Control) Engraving and Gluing.

Step four: Weighing, wherein a weight of the apron board using the composite material is less 51% than a weight of an aluminum alloy apron board of a real high-speed rail, a loading capacity of the apron board using the composite material is over 2500 Pa per unit area.

Second Embodiment

Step One: The Manufacturing of an Apron Main Plate with Mould Pressing Technique:

According to lamination design, 1 layer of 200 g/m² 3K twill carbon fiber flame retardant prepreg, 7 layers of 300 g/m² glass fiber flame retardant prepreg, 2 layers of 235 g/m² aramid retardant prepreg, 2 layers of 150 g/m² unidirectional carbon fiber flame retardant prepreg, 1 layer of 300 g/m² single component medium temperature curing blue epoxy adhesive, 2 layers of 150 g/m² unidirectional carbon fiber flame retardant prepreg, 1 piece of aramid honeycomb with a thickness of 16.4 mm, 1 layer of 300 g/m² single component medium temperature curing blue epoxy adhesive, 2 layers of 100-150 g/m² unidirectional carbon fiber flame retardant prepreg, 4 layers of 300 g/m² glass fiber retardant prepreg and 1 layer of 200 g/m² 3K twill carbon fiber flame retardant prepreg are laminated in sequence from outside to inside, all layers are pasted in a mould cavity closely with a temperature of 140° C., a molding time of 3600 s and a pressure of 4 MPa.

Step two: The manufacturing of the two apron-board trim strips 1 and the two apron-board trim strips 2 through vacuum bagging; 2 layers of 300 g/m² glass fiber flame retardant prepreg, 4 layers of 150 g/m² unidirectional carbon fiber flame retardant prepreg, 1 layer of 235 g/m² aramid flame retardant prepreg, 2 layers of 150 g/m² unidirectional carbon fiber flame retardant prepreg, 1 layer of 235 g/m² aramid flame retardant prepreg, 6 layers of 150 g/m² unidirectional carbon fiber flame retardant prepreg, and 1 layer of 200 g/m² 3K twill carbon fiber flame retardant prepreg are laminated in sequence from inside to outside; all layers are pasted closely in a mould cavity; after installation of an air duct, the apron-board trim strips are shaped through a hot press machine with a temperature of 140° C., a molding time of 3600 s, a pressure of 5 MPa, and an internal pressure of the installed air duct being 1 MPa.

Step Three: The Performing of CNC (Computer Numerical Control) Engraving and Gluing.

Step four: Weighing, wherein a weight of the apron board using the composite material is less 52% than a weight of an aluminum alloy apron board of a real high-speed rail, a loading capacity of the apron board using the composite material is over 2500 Pa per unit area.

Third Embodiment

Step One: The Manufacturing of an Apron Main Plate with Mould Pressing Technique:

According to lamination design, 1 layer of 200 g/m² 3K twill carbon fiber flame retardant prepreg, 6 layers of 300 g/m² glass fiber flame retardant prepreg, 3 layers of 235 g/m² aramid flame retardant prepreg, 2 layers of 150 g/m² unidirectional carbon fiber flame retardant prepreg, 1 layer of 300 g/m² single component medium temperature curing blue epoxy adhesive, 2 layers of 150 g/m² unidirectional carbon fiber flame retardant prepreg, 1 piece of aramid honeycomb with a thickness of 16.4 mm, 1 layer of 300 g/m² single component medium temperature curing blue epoxy adhesive, 2 layers of 100-150 g/m² unidirectional carbon fiber flame retardant prepreg, 4 layers of 300 g/m² glass fiber flame retardant prepreg and 1 layer of 200 g/m² 3K twill carbon fiber flame retardant prepreg are laminated in sequence from outside to inside, all layers are pasted in a mould cavity closely with a temperature of 150° C., a molding time of 3600 s and a pressure of 4 MPa.

Step two: The manufacturing of the two apron-board trim strips 1 and the two apron-board trim strips 2 through vacuum bagging; 1 layer of 300 g/m² glass fiber flame retardant prepreg, 4 layers of 150 g/m² unidirectional carbon fiber flame retardant prepreg, 1 layer of 235 g/m² aramid flame retardant prepreg, 2 layers of 150 g/m² unidirectional carbon fiber flame retardant prepreg, 1 layer of 235 g/m² aramid flame retardant prepreg, 8 layers of 150 g/m² unidirectional carbon fiber flame retardant prepreg, and 1 layer of 200 g/m² 3K twill carbon fiber flame retardant prepreg are laminated in sequence from inside to outside; all layers are pasted closely in a mould cavity; after installation of an air duct, the apron-board trim strips are shaped through a hot press machine with a temperature of 150° C., a molding time of 3600 s, a pressure of 6 MPa, and an internal pressure of the installed air duct is 1 MPa.

Step Three: The Performing of CNC (Computer Numerical Control) Engraving and Gluing.

Step four: Weighing, wherein a weight of the apron board using the composite material is less 51% than a weight of an aluminum alloy apron board of a real high-speed rail, a loading capacity of the apron board using the composite material is over 2500 Pa per unit area.

The basic principle, main features and advantages of the present invention have been shown and described above. It should be understood by those skilled in the art that the present invention is not limited by the foregoing embodiments. The foregoing embodiments and descriptions describe only the principle of the present invention. Without departing from the spirit and scope of the present invention, the present invention also has various changes and modifications which fall within the scope of the claimed invention. The scope of the present invention is defined by the appended claims and their equivalents.

What is claimed is:

1. A method for manufacturing an apron board of a high-speed rail equipment cabin, the method comprising:
   manufacturing an apron main plate by performing the following steps:
      forming a main plate layup by pasting the following layers sequentially in the recited order to a mold cavity:
         1 layer of 198-200 g/m² first 3K twill carbon fiber flame retardant prepreg,
         5-8 layers of 300-315 g/m² first glass fiber flame retardant prepreg,
         2 layers of 235-240 g/m² first aramid flame retardant prepreg,
         2 layers of 100-150 g/m² first unidirectional carbon fiber flame retardant prepreg,
         1 first layer of 300 g/m² single component epoxy adhesive,
         2 layers of 100-150 g/m² second unidirectional carbon fiber flame retardant prepreg,
         1 layer of aramid fiber honeycomb with a thickness of 16.4 mm,
         1 layer of 100-150 g/m² third unidirectional carbon fiber flame retardant prepreg,
         1 second layer of 300 g/m² single component epoxy adhesive,
         2 layers of 100-150 g/m² fourth unidirectional carbon fiber flame retardant prepreg,
         4 layers of 300-315 g/m² second glass fiber flame retardant prepreg, and
         1 layer of 198-200 g/m² second 3K twill carbon fiber flame retardant prepreg;
      shaping the main plate layup in a hot press machine at a temperature of 130-150° C., for a molding time of 3600-3800 s, and at a pressure of 4-6 MPa;
   manufacturing two first apron-board trim strips and two second apron-board trim strips, wherein each of the first apron-board trim strips and the second apron-board trim strips is manufacturing by performing the following steps:
      forming a respective trim strip layup by pasting the following layers sequentially to a respective mold cavity:
         1-2 layers of 300-315 g/m² third glass fiber flame retardant prepreg,
         4-6 layers of 100-150 g/m² fifth unidirectional carbon fiber flame retardant prepreg,
         1 layer of 235-240 g/m² second aramid flame retardant prepreg,
         2 layers of 100-150 g/m² sixth unidirectional carbon fiber flame retardant prepreg,
         1 layer of 235-240 g/m² third aramid flame retardant prepreg,
         4-6 layers of 100-150 g/m² seventh unidirectional carbon fiber flame retardant prepreg, and
         1 layer of 198-200 g/m² third 3K twill carbon fiber flame retardant prepreg;
      vacuum bagging the respective trim strip layup;
      shaping the respective trim strip layup in a hot press machine at a temperature of 130-150° C., for a molding time of 3600-3800 s, and at a pressure of 4-6 MPa;
   sticking the first apron-board trim strips at first and second opposite sides of the apron main plate, respectively, and
   sticking the second apron-board trim strips at third and fourth opposite sides of the apron main plate, thereby forming the apron board.

2. The method of claim 1, wherein a density of the aramid fiber honeycomb is in a range of 48-50 kg/m³.

* * * * *